Patented May 19, 1931

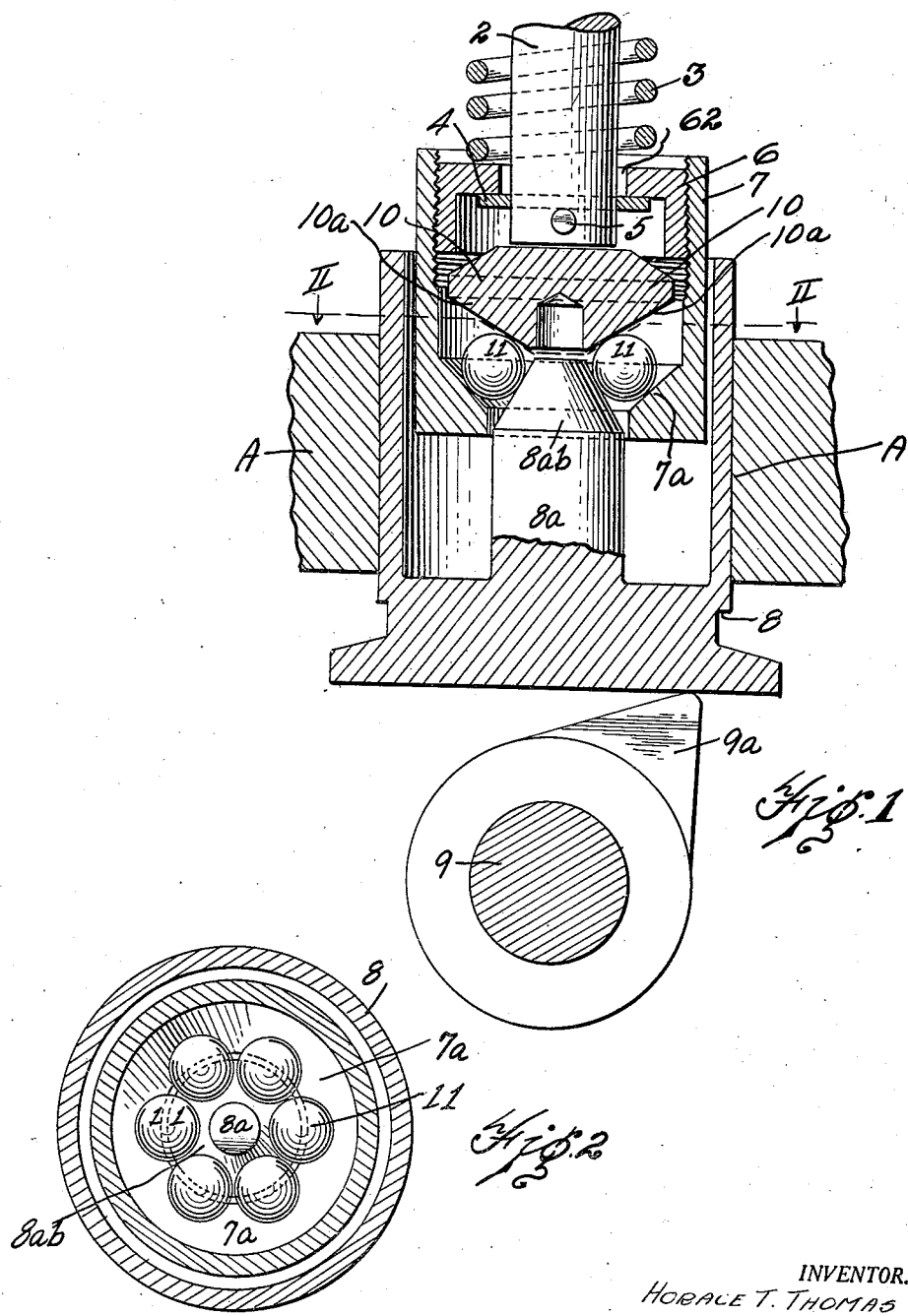

1,806,099

UNITED STATES PATENT OFFICE

HORACE T. THOMAS, OF LANSING, MICHIGAN

SELF ADJUSTING VALVE GEARING

Application filed May 10, 1929. Serial No. 361,951.

My invention relates to valve gearing and an object of my invention is to provide for self adjustment.

In the accompanying drawings—

Figure 1 is a sectional elevation of an apparatus embodying my invention.

Figure 2 is a sectional plan view in the plane indicated by the line II, II, Figure 1.

2 is the stem of a valve which may be of the conventional mushroom type used in internal combustion engines. 5 is a pin passing through the lower end of the valve stem 2. 4 is a retaining washer surrounding the stem 2 and resting upon the pin 5. 6 is an adjusting washer surrounding the stem 2, with a sufficient clearance 62 between it and the stem to provide for misalinement of parts, and resting upon the retaining washer 4. The adjusting washer 6 has a screwthreaded outer cylindrical surface. 3 is the valve spring surrounding the stem 2 and acting against the upper surface of the adjusting washer 6.

7 is a compensating sleeve having internal screw threads toward its upper end which engage the screwthreads of the adjusting washer 6. 7a is a conical seat within the sleeve 7 at its lower end. 8 is a valve tappet adapted to reciprocate in the guide A. 9 is the cam shaft and 9a is a cam on the shaft 9 adapted to actuate the tappet 8.

The tappet 8 is cylindrical and hollow from its upper end to a point toward its lower end and rising centrally from its lower end is the coaxial cylindrical projection 8a having around its upper end the conical bearing 8ab. 11 are balls resting upon the seat 7a and bearing 8ab. 10 is a part adapted at its upper surface to contact the lower end of the valve stem 2 to actuate the valve and provided around its lower portion with the conical bearing surface 10a, which rests upon the balls 11. The conical seat 7a and the bearing surface 10a are not quite parallel but diverge somewhat from each other toward their lower portions, as shown in Figure 1.

By turning the adjusting washer 6 in the sleeve 7 the valve clearance between the upper surface of the part 10 and the lower end of the stem 2 may be adjusted as required.

It is usual to set the clearance between end of valve stem and lifter mechanism on automobile motors at five thousandths of an inch for the intake valve and about eight thousandths for the exhaust valve, when the motor is cold. When the motor is hot these clearance will change to about four thousandths for intake and five thousandths for exhaust, due to expansion of valve stem and other parts.

When the dimensions of the parts are changed by a change of temperature or by wear this clearance will be very nearly maintained constant by the action of the balls 11 on their seats, or bearing surfaces 8a, 8ab and 10a.

It is desirable to have as little clearance as possible due to noisy valve action when clearance is excessive.

The ball bearing further serves to allow the tappet to turn when struck by a cam without this turning action being carried to the valve stem.

The sleeve 7 extends into the tappet 8.

It will be observed that the part 10 comes slowly into contact with the lower part of the valve stem 2 and then both move as one part at the same speed as the actuating tappet.

What I claim is:

1. The combination of a valve stem, a part relatively movable within limits longitudinally of said stem and adapted to strike against, to actuate the same, said part being secured to and carried by said stem, a valve actuating means adapted to act through said part, and a clearance measuring and adjusting device forming a connection between said valve actuating means and said part.

2. The combination of a valve stem, a part relatively movable within limits longitudinally of said stem and adapted to strike against, to actuate the same, means adapted to adjust said limits securing said part to said stem so as to be carried thereby, a valve actuating means adapted to act through said part, and a clearance measuring and adjusting device forming a connection between said valve actuating means and said part.

3. The combination of a valve stem, a part relatively movable within limits longitudinally of said stem, and adapted to strike against, to actuate the same, said part being connected with said stem so as to be carried thereby, a valve actuating means adapted to act through said part, opposing surfaces one on said part and one on a second part carried by said stem, said surfaces converging towards each other, a movable part interposed between said surfaces and a valve actuating means engaging the movable part between said surfaces.

4. The combination of a valve stem, a part relatively movable within limits longitudinally of said stem and adapted to strike against, to actuate the same, said part being connected with said stem, a valve actuating means adapted to act through said part, opposing surfaces one on said part and one on a second part carried by said stem, said surfaces converging towards each other, a movable part interposed between said surfaces and a valve actuating means engaging the movable part between said surfaces, means for adjusting the surface upon said second part in a direction longitudinally of said stem.

5. The combination of a valve stem, a part carried by said stem and relatively movable within limits longitudinally thereof, said part being adapted to strike against, to actuate said stem, a conical bearing surface on said part remote from said stem, a conical bearing surface on a second part carried by said stem and opposing the first named bearing surface, balls interposed between said bearing surfaces, said bearing surfaces converging and a valve actuating means acting through said balls.

6. The combination of a valve stem, a part carried by said stem and relatively movable within limits longitudinally adapted to strike against, to actuate said stem, a conical bearing surface on said part remote from said stem, a conical bearing surface on a second part carried by said stem and opposing the first named bearing surface, balls interposed between said bearing surfaces, said bearing surfaces converging and a valve actuating means having a conical surface engaging against said balls as and for the purpose described.

7. The combination of a valve stem, a part secured to, so as to be carried by said stem and relatively movable within limits longitudinally of said stem and adapted to strike against, to actuate the same, a valve actuating means adapted to act through said part and a reduced motion construction between said valve actuating means and said part adapted to actuate said part to take up said relative movement and then to actuate said stem without lost motion.

8. The combination of a valve stem, a part relatively movable within limits longitudinally of said stem and adapted to strike against, to actuate the same, a valve actuating means adapted to act through said part, a reduced motion construction between said actuating means and said part adapted to actuate said part to take up said relative movement and then to actuate said stem without lost motion and means securing said part to said stem so as to be carried thereby adapted to adjust said limits.

9. In a valve gearing, the combination of a valve stem, a sleeve upon said stem and extending below the lower end thereof and having an inwardly extending shoulder at its lower end and a part between the end of said stem and said shoulder and a valve actuating means adapted to act through said part, said sleeve being longitudinally adjustable upon said stem.

10. In a valve gearing, the combination of a valve stem, a sleeve upon said stem and extending below the lower end thereof and having an inwardly extending shoulder at its lower end, a part between the end of said stem and said shoulder and a valve actuating means adapted to act through said part, said valve actuating means being hollow and said sleeve extending into said hollow.

11. In a valve gearing, the combination of a valve stem, a sleeve upon said stem, and extending below the lower end thereof and having an inwardly extending shoulder at its lower end, a part between the end of said stem and said shoulder, balls between opposing surfaces of said part and of said shoulder forming a ball bearing with said surfaces and a valve actuating means adapted to act through said balls.

12. In a valve gearing, the combination of a valve stem, a sleeve upon said stem and extending below the lower end thereof and having an inwardly extending shoulder at its lower end, a part between the end of said stem and said shoulder, a valve actuating means adapted to act through said part, balls between opposing surfaces of said part and of said shoulder forming a ball and bearing with said surfaces, said valve actuating means being provided with a ball race engaging said balls.

13. In a valve gearing, the combination of a valve stem, a sleeve upon said stem and extending below the lower end thereof and having an inwardly extending shoulder at its lower end, a part between the end of said stem and said shoulder, opposing surfaces of said part and shoulder forming ball races converging toward each other, balls between said surfaces and forming a ball bearing therewith and a valve actuating means adapted to act through said bearings, there being some free motion between said part and said stem.

14. In a valve gearing, the combination of a valve stem, a sleeve upon said stem and extending below the lower end thereof and having an inwardly extending shoulder at its lower end, a part between the end of said stem and said shoulder, opposing surfaces of said part and shoulder forming ball races converging toward each other, balls between said surfaces and forming a ball bearing therewith and a valve actuating means having ball bearings engaging said balls and extending approximately at right angles to said surfaces, there being some free motion between said part and said stem.

15. The combination of a valve stem, a part relatively movable within limits longitudinally of said stem and adapted to strike against, to actuate the same, a conical bearing surface on said part remote from said stem, a conical bearing surface on a second part carried by said stem and opposing the first named bearing surface, balls interposed between said bearing surfaces, said bearing surfaces converging towards each other and a valve actuating means acting through said balls.

16. The combination of a valve stem, a part relatively movable within limits longitudinally of said stem and adapted to strike against, to actuate the same, a conical bearing surface on said part remote from said stem, a conical bearing opposing the first named bearing surface on a second part carried by said stem, balls interposed between said bearing surfaces, said bearing surfaces converging towards each other and a valve actuating means having a conical surface engaging against said balls for the purpose described.

17. In a valve gearing, the combination of a valve stem and an actuator therefor having a clearance therebetween and a lost-motion apparatus between said parts and carried by one of said parts, said apparatus being adapted to be locked by contact with the other of said parts.

18. The combination of a valve stem, a part carried by said stem and having a limited free movement relative thereto constituting the clearance, a valve actuating means acting through said part and means between said part and actuating means for obviating the relative movement of said part and valve stem when the relative movement of said stem and actuating means has progressed a certain distance.

In testimony whereof, I sign this specification.

HORACE T. THOMAS.